(12) United States Patent
Wu

(10) Patent No.: US 9,524,414 B2
(45) Date of Patent: Dec. 20, 2016

(54) ELECTRONIC DEVICE WITH FINGERPRINT INDENTIFY FUNCTION

(71) Applicant: Ye Xin Technology Consulting Co., Ltd., Hsinchu (TW)

(72) Inventor: I-Wei Wu, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 46 days.

(21) Appl. No.: 14/472,746

(22) Filed: Aug. 29, 2014

(65) Prior Publication Data

US 2015/0063663 A1    Mar. 5, 2015

(30) Foreign Application Priority Data

Aug. 30, 2013 (TW) .............................. 102131438 A

(51) Int. Cl.
| | | |
|---|---|---|
| *G06K 9/00* | (2006.01) | |
| *G06F 3/043* | (2006.01) | |
| *G06F 1/16* | (2006.01) | |

(52) U.S. Cl.
CPC ........... *G06K 9/0002* (2013.01); *G06F 1/1643* (2013.01); *G06F 3/043* (2013.01); *G06K 9/00087* (2013.01)

(58) Field of Classification Search
None
See application file for complete search history.

(56) References Cited

U.S. PATENT DOCUMENTS

| | | | | |
|---|---|---|---|---|
| 7,418,117 B2* | 8/2008 | Kim | .................... | G02F 1/13338 340/5.53 |
| 8,139,055 B2* | 3/2012 | Brown | .................. | G06F 3/0412 345/207 |
| 8,570,303 B2* | 10/2013 | Chen | ..................... | G06F 1/1601 345/175 |
| 2006/0017862 A1* | 1/2006 | Song | ................... | G02F 1/13338 349/42 |
| 2008/0024416 A1* | 1/2008 | Onogi | ............... | G02F 1/134363 345/92 |
| 2010/0321621 A1* | 12/2010 | Kikuchi | .................. | G06F 3/044 349/122 |
| 2014/0320777 A1* | 10/2014 | Fukushima | ....... | G02F 1/133305 349/43 |

* cited by examiner

*Primary Examiner* — Daniel Mariam
(74) *Attorney, Agent, or Firm* — Zhigang Ma

(57) ABSTRACT

An electronic device comprises a display module for displaying images, an identify module and a substrate where the display module and the identify module located on. When an object is pressed against the electronic device, the identify module obtains a grayscale image of the object pressed against the electronic device to identify the object. The identify module comprise a first thin film transistor (TFT) array. The display module comprises a second TFT array integrated with the first TFT array to form a TFT substrate arranged on the substrate.

13 Claims, 8 Drawing Sheets

US 9,524,414 B2

ELECTRONIC DEVICE WITH FINGERPRINT INDENTIFY FUNCTION

CROSS-REFERENCE TO RELATED APPLICATIONS

This application claims priority to Taiwan Patent Application No. 102131438 filed on Aug. 30, 2013 in the Taiwan Intellectual Property Office, the contents of which are incorporated by reference herein.

FIELD

The present disclosure relates to an electronic device with fingerprint identify function.

BACKGROUND

Electronic device with fingerprint identify function includes a fingerprint sensor and other components. The fingerprint sensor is independently mounted from other components.

BRIEF DESCRIPTION OF THE FIGURES

Implementations of the present technology will now be described, by way of example only, with reference to the attached figures.

FIG. 4 is a diagrammatic view of an embodiment of the electronic device of FIG. 3 without a finger pressed on.

FIG. 5 is a diagrammatic view of another embodiment of the electronic device of FIG. 3 with a finger pressed on.

DETAILED DESCRIPTION

Figure 1:
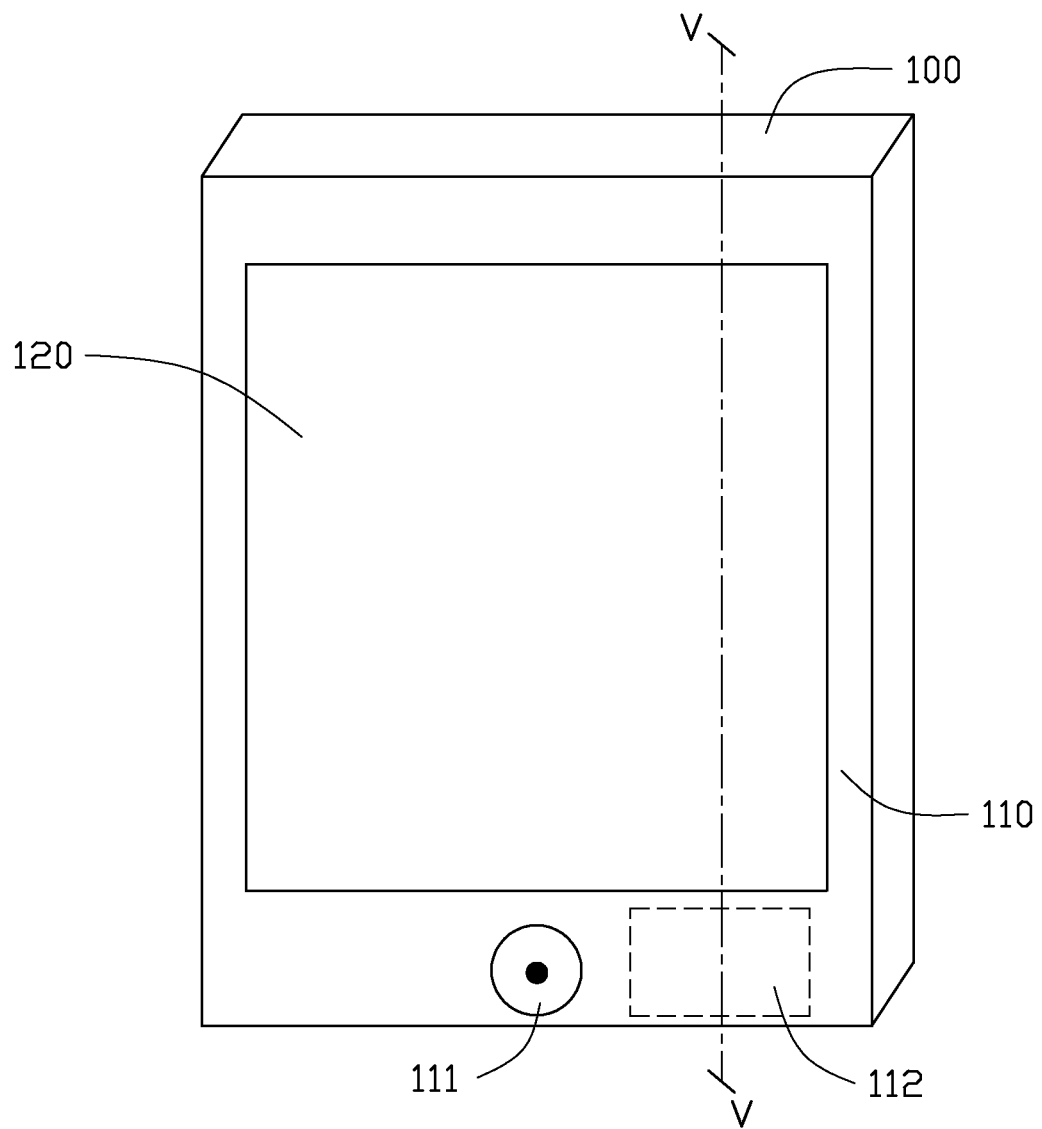
FIG. 1 is an isometric view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

An electronic device with an integration fingerprint identify module is described.

FIG. 1 illustrates an embodiment of an electronic device 100. The electronic device 100 includes a viewing surface which includes a peripheral region 110 and a display region 120 surrounded by the peripheral region 110. A button 111 is located at the peripheral region 110 to switch on/off the electronic device 100 or light the viewing surface. A fingerprint inputting region 112 is defined at the peripheral region 110. In at least one embodiment, the electronic device 100 can be a mobile phone, a personal digital assistant, or a tablet compute, for example.

Figure 2:
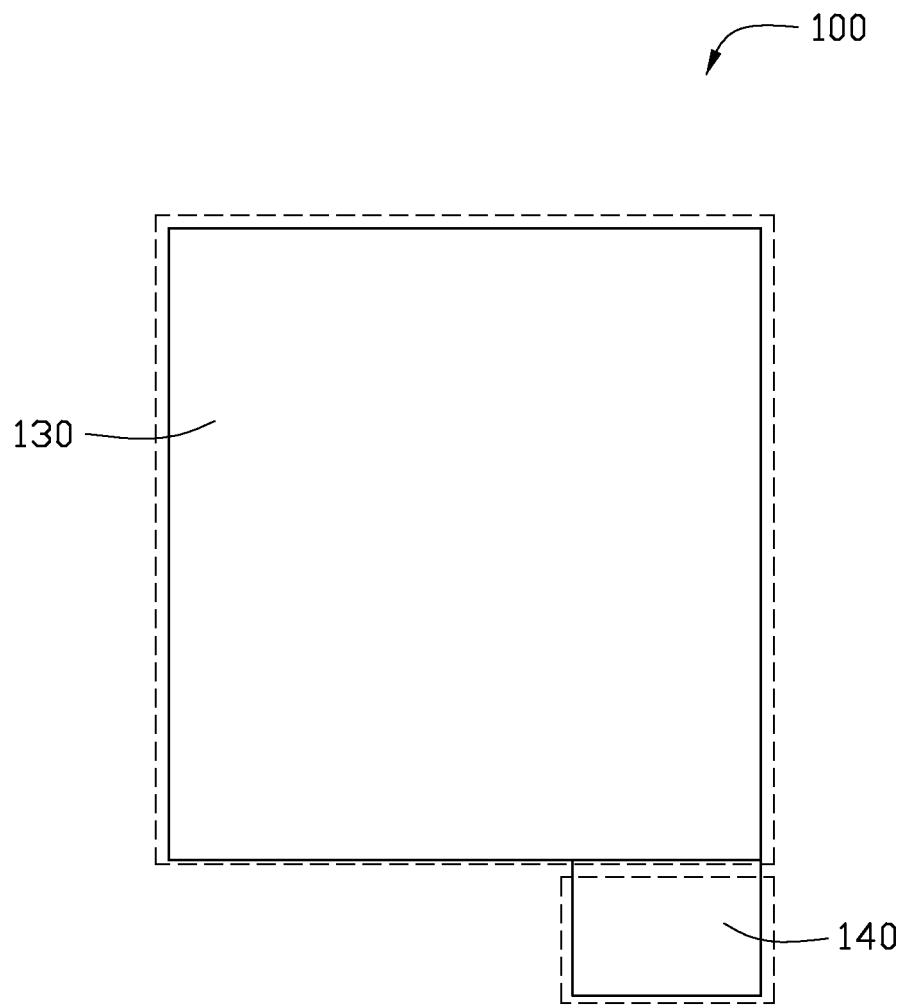
FIG. 2 is a block view of an embodiment of the electronic device of FIG. 1.

FIG. 2 illustrates that the electronic device 100 further includes a display module 130 corresponding to the display region 120 and an identify module 140 corresponding to the fingerprint inputting portion 112. The display module 130 is capable of displaying images. In at least one embodiment, the display module 130 is a liquid crystal display (LCD) or an organic light emitting display (OLED).

The identify module 140 indentifies an object contacted with the fingerprint inputting portion 112. In at least one embodiment, the identify module 140 is an ultrasonic fingerprint sensor.

Figure 3:
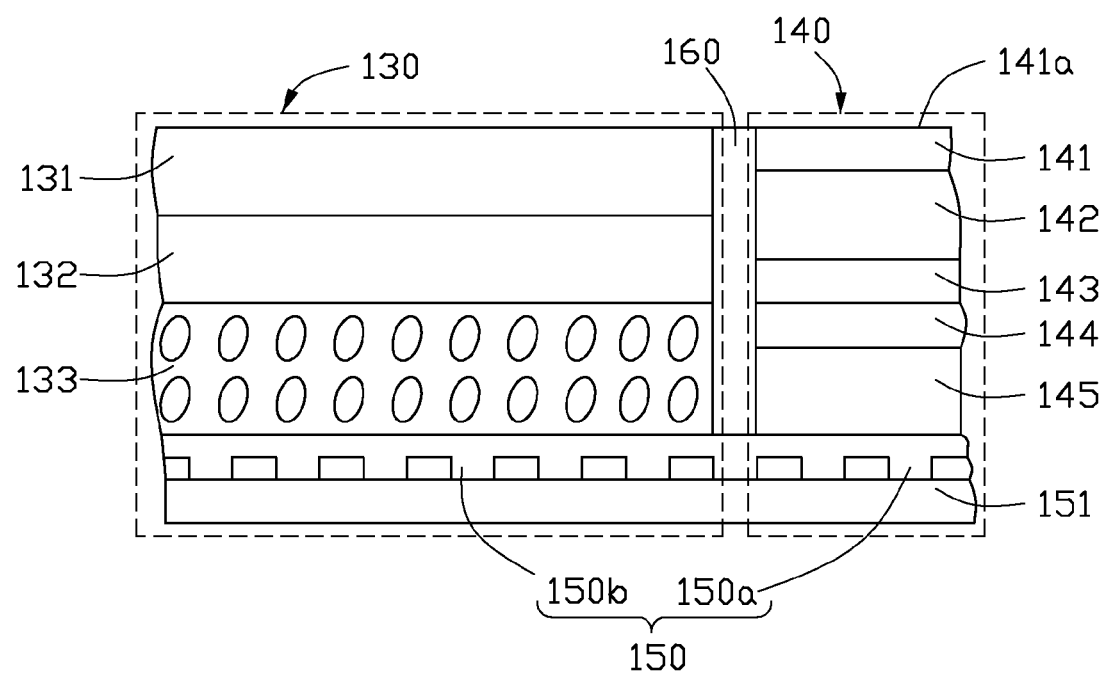
FIG. 3 is a cross sectional view of an embodiment of the electronic device of FIG. 1, taken along a line V-V thereof, the electronic device including a fingerprint identify module.

FIG. 3 illustrates that the identify module 140 includes a contact layer 141, a signal transmitter layer 142, an insulating layer 143, a signal conduction layer 144, a signal receiving layer 145, a first thin film transistor (TFT) array 150a, and a substrate 151, which are orderly arranged on the substrate 151.

The contact layer 141 is a top layer for connecting with the object, and reflects ultrasonic signals from the signal transmitter layer 142. The contact layer 141 includes a contact surface 141a away from the signal transmitter layer 142. The thickness of the contact surface 141a is less than a wavelength of the ultrasonic frequency for improving response time of the identify module 140. In at least embodiment, the contact layer 141 is made one of mylar, epoxy, silicone, polymethyl methacrylate (PMMA), or polydimethylsiloxane (PDMS).

The signal transmitter layer 142 continuously generates ultrasonic signals to the contact layer 141 and the signal receiving layer 145. In at least embodiment, the signal transmitter layer 142 is made one of polyvinylidene fluoride (PVDF), or polyvinylidene fluoride-trifluorethylene (PVDF-TrFE), a piezoelectric transducer (PZT), or an electrostatic transducer.

The insulating layer 143 insulates the signal transmitter layer 142 and the signal receiving layer 145. In other embodiment, the insulating layer 143 can be omitted.

The signal conduction layer 144 superposes the reflected ultrasonic signal from the contacting layer 141 and the ultrasonic signal from the signal emitting layer 142, and transmits the superposed signal to the signal receiving layer 145.

The signal receiving layer 145 transfers the superposed ultrasonic signal received by the signal conduction layer 144 into electronic signal. The signal receiving layer 145 includes a plurality of signal processing units. Each of the signal receiving units includes a polymer receiver and a receiving circuit. In the at least embodiment, the polymer receiver is made one of PVDF, PVDF-TrFE, a PZT, or an electrostatic transducer. The processing circuit transfers the signals received by the corresponding receiving unit into electronic signals, and transmits the transferred electronic signals to the first TFT array 150a.

The TFT array 150a obtains a grayscale image of the objected pressed against the electronic device based on the electronic signal generated by the TFT array 150a. The TFT array 150a includes a plurality of independent TFTs and circuits connected with the TFTs. In at least one embodiment, the substrate 151 is made of glass, quartz, plastics, or polyamide material.

Figure 4:
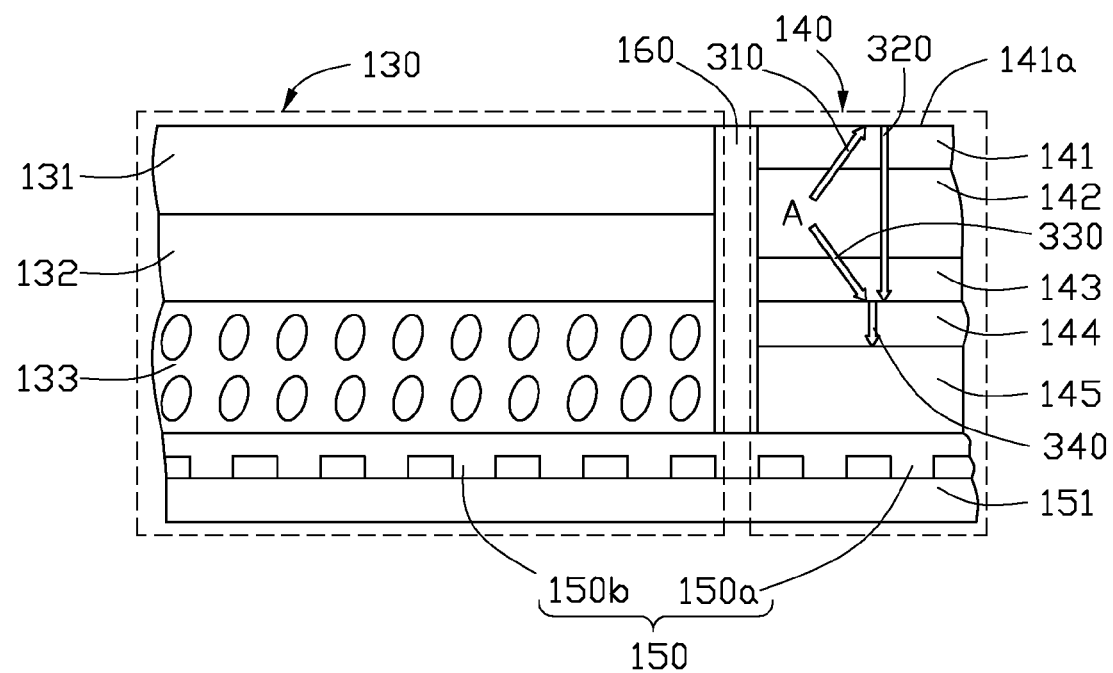

FIG. 4 illustrates the signal transmitter layer 142 generates a first ultrasonic signal 310 to the contact layer 141 from point A and a second ultrasonic signal 330 to the signal receiving layer 145 from point A. The energy of the first ultrasonic signal 310 and the second ultrasonic signal 330 are equivalent with each other. The first ultrasonic signal 310 is reflected by the contact surface 141a to form the reflected first ultrasonic signal 320. The reflected first ultrasonic signal 320 and the second ultrasonic signal 330 are superposed to form the superposed ultrasonic signal 340. The superposed ultrasonic signal 340 is transmitted to the signal receiving layer 145.

When there is no objected pressed against on the contact surface 141a, the reflected ultrasonic signal 320 and the ultrasonic signal 330 are 180 degree out of phase with the equivalent energy, which cause the energy of the superposed ultrasonic signal 340 to be zero. There is no superposed ultrasonic signal 340 received by the signal receiving layer 145, which cause no grayscale image obtained by the TFT array 150a.

Figure 5:
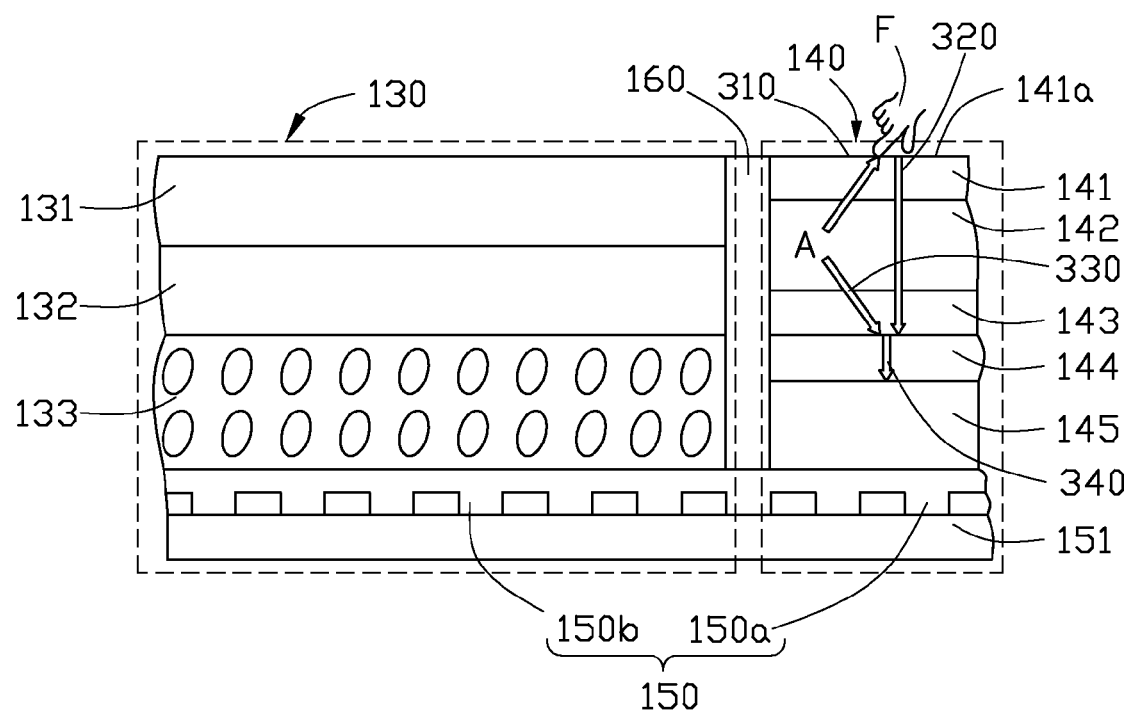

FIG. 5 illustrates that a finger F contacts with the contact surface 141a. Parts of the ultrasonic signals are absorbed by the finger F. The reflected first ultrasonic signal 320 and the second ultrasonic signal 330 are not 180 degree out of phase. The energy of the reflected first ultrasonic signal 320 is less than the energy of the second ultrasonic signal 330, which cause the energy of the superposed ultrasonic signal 340 not to be zero. The signal receiving layer 145 transmits the superposed ultrasonic signal 340, which cause the corresponding grayscale image obtained by the first TFT array 150a based on the transferred the superposed ultrasonic signal. The resistances of ridges and valleys of a specified finger are different, which cause different energy absorbed ratio, which cause the grayscale image to identify a fingerprint of the finger pressed on the fingerprint inputting portion 112.

The display module 130 includes a touch screen 131, an opposite substrate 132, a liquid crystal layer 133, and a second TFT array 150b, which are orderly arranged on the substrate 151. The touch screen 131 detects touch operations on the touch screen 131. The opposite substrate 132 cooperates with the second TFT array 150b for driving liquid crystals in the liquid crystal layer 133 to rotate. The first TFT array 150a and second TFT array 150b are integrated to form a TFT substrate 150. In at least one embodiment, the TFT substrate 150 is made one of amorphous silicon (a-Si), polycrystalline silicon (p-Si), or low temperature poly silicon (LTPS) material. In other embodiments, the touch screen 131 can be replaced by an embedded touch structure.

The electronic device 100 further includes a rubber frame 160 sandwiched between the display module 130 and the identify module 140. The rubber frame 160 fixes the display module 130 and the identify module 140 together.

Figure 6:
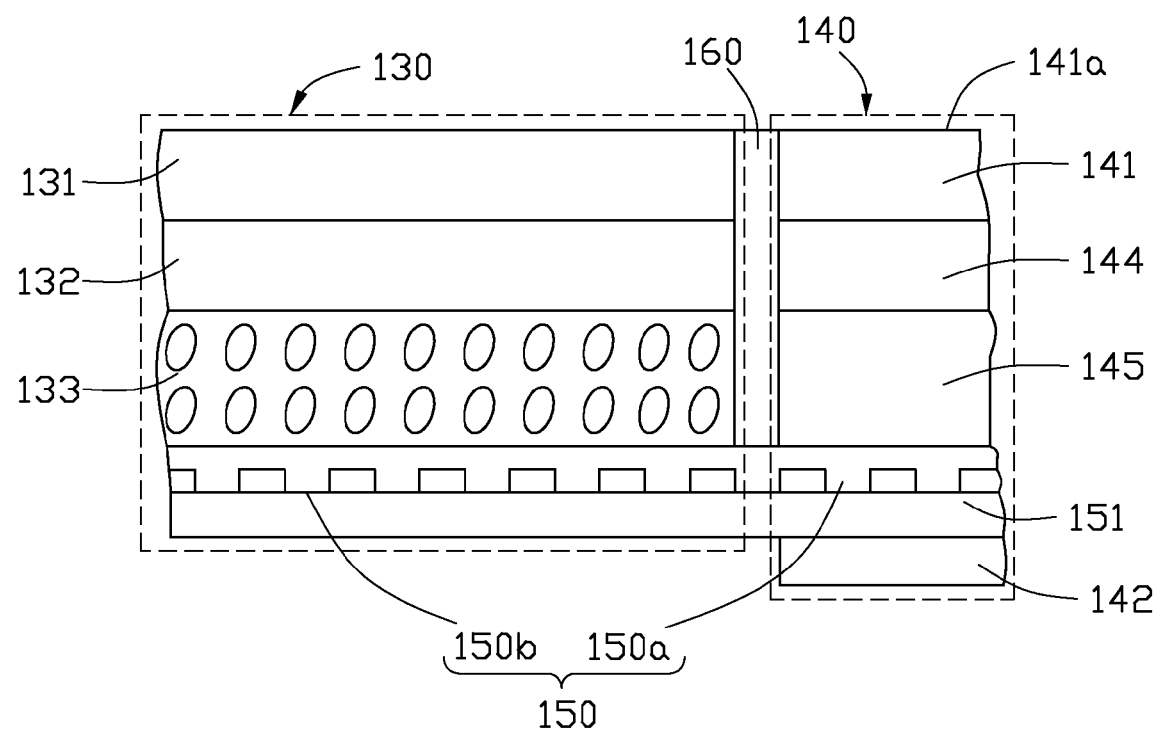
FIG. 6 is a cross sectional view of another embodiment of the fingerprint identify module of FIG. 3.

FIG. 6 illustrates an another embodiment of the identify module 140 of the electronic device 100 shown in FIG. 3. The contact layer 141, the signal conduction layer 144, the signal receiving layer 145, the first TFT array 150a, and the signal transmitter layer 142, which are orderly arranged on the substrate 151. In other words, the first TFT array 150a is sandwiched between the signal transmitter layer 142 and the signal receiving layer 145. The insulating layer 143 is omitted.

Figure 7:
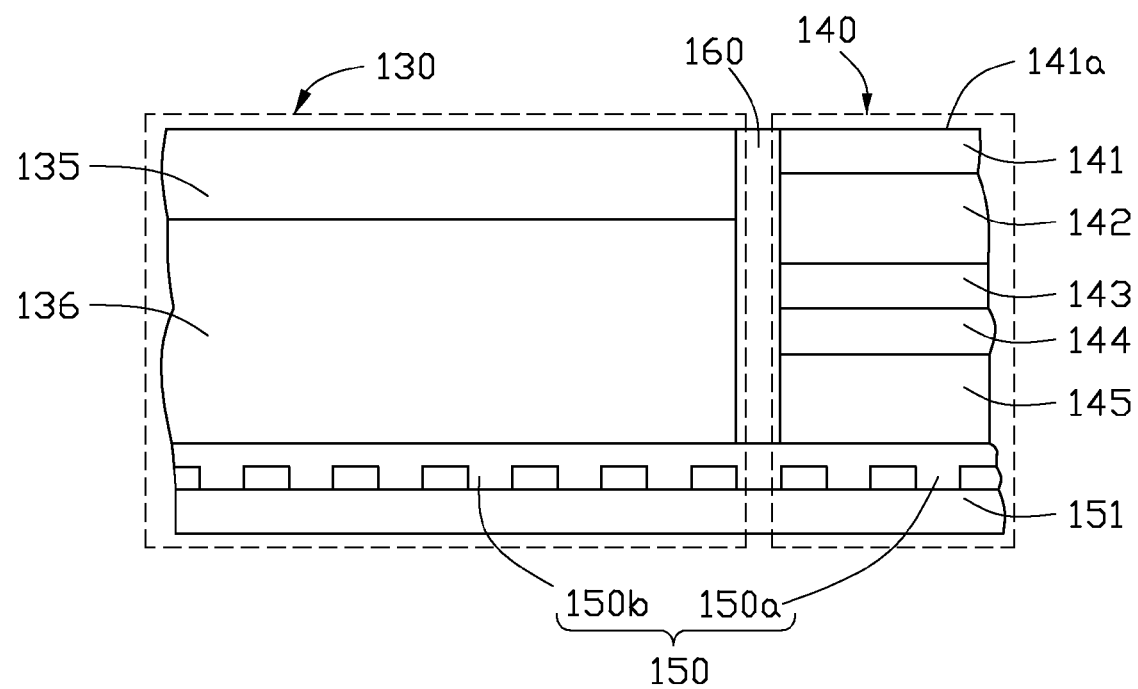
FIG. 7 is a cross sectional view of another embodiment of the electronic device of FIG. 1, taken along a line V-V thereof, the electronic device including a fingerprint identify module.

FIG. 7 illustrates another embodiment of the electronic device 100 with different display module 130. The display module 130 includes a touch screen 135, an organic light-emitting layer 136, a second TFT array 150b, which are orderly arranged on the substrate 151. The touch screen 135 detects touch operations on the touch screen 135. The second TFT array 150b drives the organic light-emitting layer 136 to display images. The first TFT array 150a and second TFT array 150b are integrated together to form a TFT substrate 150. In at least one embodiment, the TFT substrate 150 is made one of a-Si, p-Si, or LTPS material. In other embodiments, the touch screen 135 can be replaced by an embedded touch structure. The electronic device 100 further includes a rubber frame 160 sandwiched between the display module 130 and the identify module 140. The rubber frame 160 fixes the display module 130 and the identify module 140 together.

Figure 8:
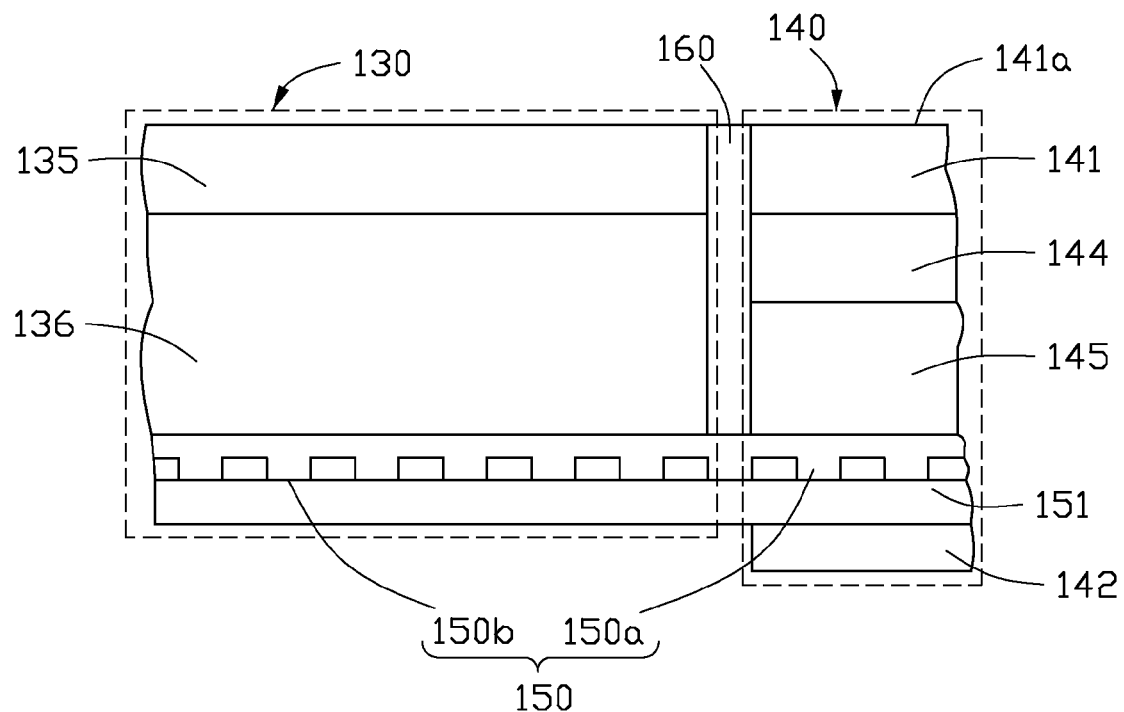
FIG. 8 is a cross sectional view of another embodiment of the fingerprint identify module of FIG. 7.

FIG. 8 illustrates another embodiment of the identify module 140 of the electronic device 100 shown in FIG. 7. The contact layer 141, the signal conduction layer 144, the signal receiving layer 145, the first TFT array 150a, the signal transmitter layer 142, which are orderly arranged on the substrate 151. In other words, the first TFT array 150a is sandwiched between the signal transmitter layer 142 and the signal receiving layer 145. The insulating layer 143 is omitted.

In use, the display module 130 and the identify module 140 are integrated together, thus the manufacture process of the electronic device 100 is improved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. An electronic device comprising:
    a display region configured to display images;
    a peripheral region around the display region;
    a fingerprint inputting region defined at the peripheral region;
    a display assembly corresponding to the display region for displaying images;
    an identify assembly corresponding to the fingerprint inputting region configured to obtain a grayscale image of the object pressed against the electronic device; and
    a substrate,
    wherein the display assembly and the identify assembly are located on the substrate; the identify assembly comprises a first thin film transistor (TFT) array; the display assembly comprises a second TFT array; the first TFT array and the second TFT array are integrated to form a TFT substrate; and the TFT substrate is arranged on the substrate; and
    wherein the identify assembly further comprises a contact layer, a signal transmitter layer, a signal conduction layer, and a signal receiving layer which are orderly arranged on the first TFT array; the signal transmitter layer continuously generates ultrasonic signals to the contact layer and the signal receiving layer; the contact layer reflects ultrasonic signals; the signal conduction layer superposes the reflected ultrasonic signal from the contacting layer and the ultrasonic signal from the signal emitting layer; the signal receiving layer transfers the superposed ultrasonic signals into electronic signals; the first TFT array obtains the grayscale image of the object pressed against the electronic device based on the transferred electronic device generated by the signal receiving layer.

2. The electronic device of claim 1, wherein the contact layer, the signal conduction layer, the signal receiving layer, the first TFT array, and the signal transmitter layer are orderly arranged on the substrate.

3. The electronic device of claim 1, wherein the identify assembly further comprises an insulating layer for insulating the signal transmitter layer and the signal receiving layer; the contact layer, the signal transmitter layer, an insulating layer, the signal conduction layer, the signal receiving layer, the first TFT array are orderly arranged on the substrate.

4. The electronic device of claim 1, wherein the signal transmitter layer is made one of polyvinylidene fluoride (PVDF), polyvinylidene fluoride-trifluorethylene (PVDF-TrFE), a piezoelectric transducer (PZT), and an electrostatic transducer.

5. The electronic device of claim 1, wherein the contact layer further comprises a contact surface away from the signal transmitter layer; the thickness of the contact surface is less than the wavelength of the ultrasonic frequency.

6. The electronic device of claim 5, wherein the contact surface is made one of mylar, epoxy, silicone, polymethyl methacrylate, and polydimethylsiloxane.

7. The electronic device of claim 1, wherein when there is no object pressed against the electronic device, the reflected ultrasonic signals and the ultrasonic signal from the signal transmitter layer are 180 degrees out of phase with equivalent energy; the energy of the superposed ultrasonic signal is zero, therefore no grayscale image obtained.

8. The electronic device of claim 1, wherein when the object is pressed against electronic device, the reflected ultrasonic signals and the ultrasonic signal from the signal transmitter layer are not 180 degrees out of phase, and the energy of the reflected ultrasonic signals is absorbed by the object; the energy of the superposed ultrasonic signal is not zero, a specified grayscale image is obtained based on the transferred the superposed ultrasonic signal.

9. The electronic device of claim 1, further comprising a rubber frame, wherein the rubber frame is sandwiched between the display assembly and the identify assembly; and the rubber frame fixes the display assembly and the identify assembly together.

10. The electronic device of claim 1, wherein the TFT substrate is made of one of amorphous silicon, polycrystalline silicon, or low temperature poly silicon material.

11. The electronic device of claim 1, wherein the display assembly further comprises a touch screen, an opposite substrate, and a liquid crystal layer, which are orderly arranged on the second TFT array; the touch screen detects touch operations on the touch screen; the opposite substrate cooperates with the second TFT array for driving liquid crystals in the liquid crystal layer to rotate.

12. The electronic device of claim 1, wherein the display assembly further comprises a touch screen and an organic light-emitting layer arranged on the second TFT array; the organic light-emitting layer is sandwiched between the touch screen and the second TFT array, and the second TFT array drives the organic light-emitting layer to display images.

13. The electronic device of claim 1, wherein the substrate is made of glass, quartz, plastics, or polyamide material.

* * * * *